(12) United States Patent
Kasuga (10) Patent No.: US 9,804,354 B2
(45) Date of Patent: Oct. 31, 2017

(54) LENS DRIVE APPARATUS

(71) Applicant: SHARP KABUSHIKI KAISHA, Osaka-shi, Osaka (JP)

(72) Inventor: Kyoji Kasuga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 83 days.

(21) Appl. No.: 14/655,411

(22) PCT Filed: Oct. 1, 2013

(86) PCT No.: PCT/JP2013/076682
§ 371 (c)(1),
(2) Date: Jun. 25, 2015

(87) PCT Pub. No.: WO2014/103457
PCT Pub. Date: Jul. 3, 2014

(65) Prior Publication Data
US 2015/0355432 A1    Dec. 10, 2015

(30) Foreign Application Priority Data
Dec. 26, 2012 (JP) ............................... 2012-283562

(51) Int. Cl.
*G02B 7/02* (2006.01)
*G02B 7/10* (2006.01)
*G02B 7/08* (2006.01)
*H02K 41/035* (2006.01)
*G03B 3/10* (2006.01)
*G03B 5/00* (2006.01)

(52) U.S. Cl.
CPC .............. *G02B 7/026* (2013.01); *G02B 7/08* (2013.01); *G02B 7/10* (2013.01); *G03B 3/10* (2013.01); *G03B 5/00* (2013.01); *H02K 41/0356* (2013.01); *G03B 2205/0053* (2013.01)

(58) Field of Classification Search
CPC . G02B 7/026; G02B 7/10; G02B 7/08; G03B 3/10; G03B 5/00; G03B 2205/0053; H02K 41/0356
See application file for complete search history.

(56) References Cited

U.S. PATENT DOCUMENTS

2006/0181632 A1    8/2006  Makii et al.
2012/0008221 A1*   1/2012  Min ................... H02K 41/0356
                                                    359/824

FOREIGN PATENT DOCUMENTS

CN    102692691 A    9/2012
JP    05-165085      6/1993
(Continued)

OTHER PUBLICATIONS

International Search Report for PCT/JP2013/076682 dated Dec. 3, 2013, four pages.
(Continued)

*Primary Examiner* — Alicia M Harrington
(74) *Attorney, Agent, or Firm* — Nixon & Vanderhye P.C.

(57) ABSTRACT

A part (91, 92) of a lower plate spring (9) of a lens driving device (1) includes a base-fixed section (911, 921) fixed to a base (11), a lens holder fixing section (912, 922) fixed to a lens holder (8), and an arm section (913, 923) connecting the base-fixed section (911, 921) and the lens holder fixing section (912, 922) to each other, the base-fixed section (911, 921) including a terminal connection section (911b, 921b) near which an elastic section (911c, 921c) is provided.

4 Claims, 7 Drawing Sheets

(56) References Cited

FOREIGN PATENT DOCUMENTS

| | | |
|---|---|---|
| JP | 07-041992 | 7/1995 |
| JP | 2006-251216 | 9/2006 |
| JP | 2011-102823 | 5/2011 |
| JP | 2012-247654 | 12/2012 |

OTHER PUBLICATIONS

Written Opinion of the ISA w/ English Translation for PCT/JP2013/076682 dated Dec. 3, 2013, six pages.

* cited by examiner

9: Lower side plate spring
91, 92: Part
911, 921: Base-fixed section
911a, 921a: Positioning hole
911b, 921b: Terminal connection section
911c, 921c: Elastic section
912, 922: Lens holder fixing section
912a, 922a: Coil connection section
913, 923: Arm section

11:Base
111:First base segment
112:Second base segment
11a:Plate spring fixing section
11b:Boss
11d:Terminal fixing section
101,102:First terminal, second terminal
10a:Plate spring connection section
10b:Substrate connection section

LENS DRIVE APPARATUS

This application is the U.S. national phase of International Application No. PCT/JP2013/076682 filed 1 Oct. 2013 which designated the U.S. and claims priority to JP Patent Application No. 2012-283562 filed 26 Dec. 2012, the entire contents of each of which are hereby incorporated by reference.

TECHNICAL FIELD

The present invention relates to a lens driving device mounted in electronic equipment having the function of capturing a still image or moving image. In particular, the present invention relates to a plate spring that is provided on a lens holder for holding a lens barrel and that supports the lens holder in such a manner that the lens holder is displaceable along an optical axis relative to a fixing section including a base member.

BACKGROUND ART

Recent years have seen more and more pieces of electronic equipment such as mobile phones include a relatively small camera unit. Such a small camera unit typically includes (i) a lens driving device having a driving mechanism including a lens and (ii) a sensor substrate including elements such as an image sensing element. The lens driving device is arranged such that a coil included in the driving mechanism is electrically connected to the sensor substrate for supply of electric current to the coil. The lens driving device further includes power feeding terminals that allow electric current to be supplied from the sensor substrate to the coil. Various techniques have been proposed for the connection between a lens driving device and a sensor substrate.

Patent Literature 1, for example, proposes a lens driving device including: a movable section having a movable lens and movable along an optical axis relative to a lens barrel; a linear actuator having a driving magnet and a driving coil and serving to move the movable section along the optical axis; and a pair of urging plate springs each having (i) a holding section for holding the movable member, (ii) a plurality of spring sections for urging the movable section along the optical axis, and (iii) an attachment section that is attached to the lens barrel, one of the pair of urging plate springs including two spring members, the two spring members each having (i) a coil connection section that is connected to both ends of the driving coil and (ii) a connection terminal section that allows electric current to flow into the driving coil.

The lens driving device disclosed in Patent Literature 1 is arranged such that the plate springs each have a connection terminal section that is bent by approximately 90 degrees with respect to the attachment section and that protrudes behind (toward the sensor substrate).

Patent Literature 2 discloses a technique of providing terminals in a base member of a lens driving device to electrically connect a plate spring to a substrate through the terminals. Patent Literature 2 proposes soldering an end surface of the plate spring to an end surface of the corresponding terminal for connection.

CITATION LIST

Patent Literatures

Patent Literature 1
Japanese Patent Application Publication, Tokukai, No. 2006-251216 A (Publication Date: Sep. 21, 2006)
Patent Literature 2
Japanese Patent Application Publication, Tokukai, No. 2011-102823 A (Publication Date: May 26, 2011)

SUMMARY OF INVENTION

Technical Problem

The lens driving device disclosed in Patent Literature 1 is unfortunately problematic as follows: The plate springs are each bent for use as a power feeding terminal, so the power feeding terminals are only several tens of microns thick as with the plate springs. The power feeding terminals are thus low in strength and each have an unstable tip position. This has made it difficult to connect the power feeding terminals to the substrate.

The lens driving device disclosed in Patent Literature 2 is also problematic as follows: The terminals are soldered to the plate spring for connection, so an end of the plate spring is connected to an end surface of the corresponding terminal by soldering. This has made it difficult to achieve stable contact points between the plate spring and the terminals.

The present invention has been made in view of the above problems. It is an object of the present invention to provide a lens driving device including a plate spring and a terminal connected more stably to each other.

Solution to Problem

In order to attain the above object, a lens driving device in accordance with a mode of the present invention includes: a movable body holding a lens and movable along an optical axis of the lens; a driving mechanism for driving the movable body along the optical axis; a plate spring supporting the movable body in such a manner that the movable body is movable along the optical axis; and a base section to which the plate spring is attached, the driving mechanism including a driving coil to be attached to the movable body, the base section having a terminal attached thereto for supplying electric current to the driving coil, the plate spring including: a movable-body-fixed section fixed to the movable body and having a connection section electrically connected to the driving coil; a base-section-fixed section fixed to the base section; an arm section connecting the movable-body-fixed section and the base-section-fixed section to each other; a terminal connection section electrically connected to the terminal; and an elastic section connecting the base-section-fixed section and the terminal connection section to each other and urging the terminal connection section to the terminal.

Advantageous Effects of Invention

With a mode of the present invention, the plate spring includes a base-section-fixed section and a terminal connection section, the base-fixed section and the terminal connection section being connected to each other by an elastic section. This arrangement allows stable electric connection between the plate spring and the terminal.

DESCRIPTION OF EMBODIMENTS

[Embodiment 1]

Figure 2:
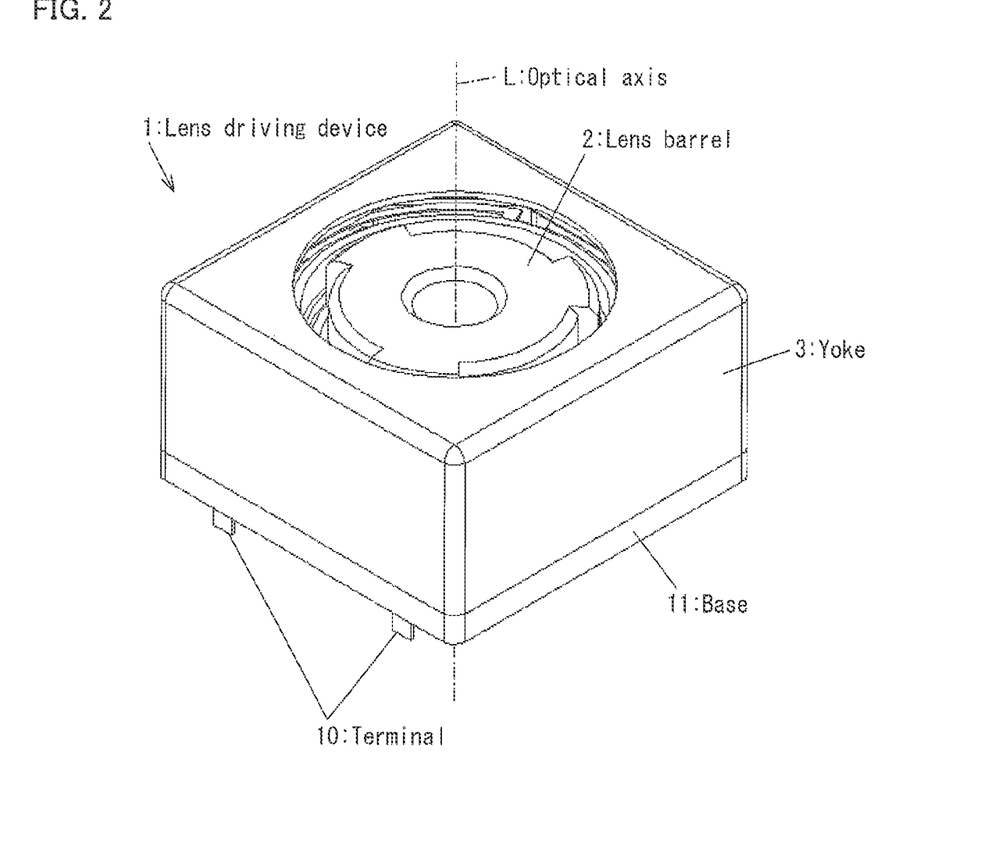
FIG. 2 is a perspective view of a lens driving device in accordance with an embodiment of the present invention.
Figure 3:
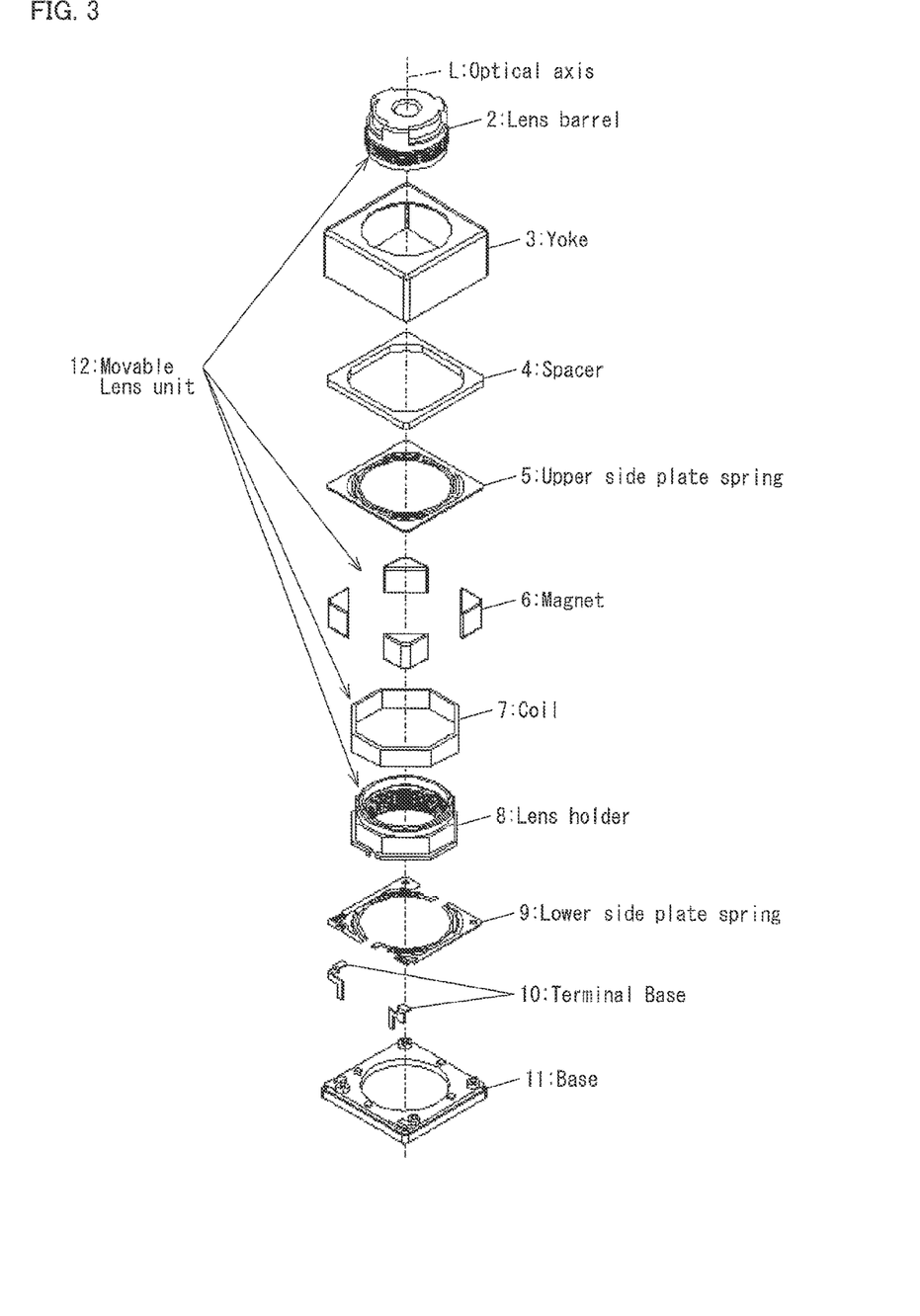
FIG. 3 is an exploded perspective view of a lens driving device in accordance with an embodiment of the present invention.

The description below deals with an embodiment of the present invention with reference to FIGS. 1 through 7. FIG. 2 is a perspective view of a lens driving device of an embodiment (Embodiment 1) of the present invention. FIG. 3 is an exploded perspective view of the lens driving device.

(Appearance and Main Configuration of Lens Driving Device)

The description below first deals with an appearance and main configuration of the lens driving device with reference to FIG. 2. The lens driving device 1, as illustrated in FIG. 2, serves to move a lens barrel 2 along an optical axis L. The lens driving device 1 is, for example, a VCM lens driving device including a voice coil motor (VCM) as a driving source (driving method). The lens driving device 1 is combined with a sensor substrate (not shown) and an image sensing element (not shown) to constitute a camera module. Such a camera module is mounted in electronic equipment such as a mobile phone or a tablet personal computer (PC).

The lens driving device 1 is, as illustrated in FIG. 2, substantially in the shape of a square pole. The lens driving device 1 includes as main members (i) a yoke 3 for housing various members such as the lens barrel 2, (ii) a base 11 serving as a base section for attachment to a sensor substrate, and (iii) two terminals 10.

The description below uses (i) the terms "upper" to refer to a direction on the optical axis L of the lens driving device 1 which direction is toward a target object and (ii) the term "lower" to refer to a direction on the optical axis L of the lens driving device 1 which direction is away from a target object. The description below regards, as a horizontal plane, a plane perpendicular to the optical axis L. The description below uses (i) the term "front surface" to refer to a surface of the lens driving device 1 to which surface the two terminals 10 are attached and (ii) the term "back surface" to refer to a surface of the lens driving device 1 which surface is opposite to the surface to which the two terminal 10 are attached. The description below regards, as "left-and-right direction", a direction perpendicular to (i) a line perpendicular to the front surface and the back surface and (ii) the optical axis L.

The yoke 3 forms (i) an upper surface of the lens driving device 1 and (ii) most of side surfaces of the lens driving device 1. Specifically, the yoke 3 is used not only to form a magnet circuit together with magnets 6 (described later), but also to serve as a cover member for housing an internal mechanism of the lens driving device 1. The yoke 3 has four side surfaces arranged, for example, such that two opposite side surfaces are substantially parallel to each other. The yoke 3 has an upper surface having a circular opening, which allows the lens barrel 2, for example, to be exposed to the outside (for example, a target object). The yoke 3 covers an upper portion of the base 11. Note that the shape of the yoke 3 illustrated in FIG. 2 is merely an example, so the yoke 3 may vary in shape depending on the shape of the internal mechanism housed inside the yoke 3.

The base 11 forms (i) a bottom surface of the lens driving device 1 and (ii) a portion of the side surfaces of the lens driving device 1. The base 11 is superjacent to a sensor substrate (not shown). The base 11, as illustrated in FIG. 3, has an opening that allows passage therethrough of light entering the lens driving device 1 through the lens barrel 2. The base 10 is provided with two terminals 10 attached thereto.

The two terminals 10 are so attached to an edge of the base 11 as to be apart from each other in the left-and-right direction. The two terminals 10 are electrically connected to the sensor substrate disposed below the base 11.

The sensor substrate allows electronic components such as an image sensing element and a clock generating source to be mounted thereon. The image sensing element is so disposed on the sensor substrate as to lie (i) under the lens barrel 2 and (ii) on the optical axis L. The image sensing element receives light entering the lens driving device 1 through the lens barrel 2 and converts such light into an electric signal. The image sensing element includes, for example, an image sensor including (i) a charge coupled device (CCD) or (ii) a complementary metal oxide semiconductor (CMOS).

The yoke 3 and the base 11 are each, as an example, substantially in the shape of a regular square as viewed in the up-and-down direction.

(Internal Mechanism and Detailed Configuration of Lens Driving Device)

The description below deals with the internal mechanism and detailed configuration of the lens driving device 1 with reference to FIG. 3. As illustrated in FIG. 3, the yoke 3 of the lens driving device 1 houses an assembly of (i) a spacer 4, (ii) an upper plate spring 5, (iii) a movable lens unit 12, and (iv) a lower plate spring 9 arranged in that order from above to below. The description below uses the term "pair of plate springs 5 and 9" to collectively refer to the upper plate spring 5 and the lower plate spring 9.

The movable lens unit 12 includes (i) the lens barrel 2, (ii) a lens holder 8 supporting the lens barrel 2, (iii) a driving coil 7 so fixed as to be positioned around the outer periphery of the lens holder 8, and (iv) magnets 6 disposed around the outer periphery of the driving coil 7.

The lens holder 8 is a cylindrical member for supporting the lens barrel 2. The lens holder 8 is, as an example, so shaped that (i) its inner peripheral surface is substantially in the shape of a circle as viewed in the up-and-down direction and that (ii) its outer peripheral surface is substantially in the shape of a regular octagon as viewed in the up-and-down direction.

The driving coil 7 is electrically connected (described later in detail) to the lower plate spring 9. The driving coil 7 receives electric power from the lower side plate 9 to act together with the magnets 6 to generate driving power for the movable lens unit 12. The driving coil 7 is, as an example, in the shape of a cylinder so sized as to surround the lens holder 8 around its outer periphery. The driving coil 7 has an upper end and a lower end each substantially in the shape of an octagon as viewed in the up-and-down direction.

The magnets 6, as an example, include four segments each substantially in the shape of a triangular prism. The four segments are disposed in a space defined by side surfaces of the yoke 3 and the periphery of the driving coil 7. The four segments are thus arranged such that two segments face each other on one of the two diagonal lines of the yoke 3.

The pair of plate springs 5 and 9 are disposed at respective ends of the lens holder 8 which ends are present along the optical axis.

The pair of plate springs 5 and 9 support the lens holder 8 in such a manner that the lens holder 8 is (i) aligned in the radial direction and is (ii) displaceable along the optical axis.

The upper plate spring 5 has a frame portion along the periphery which frame portion is fixed to the spacer 4. The spacer 4 is fixed to an inside surface of an upper portion of the yoke 3.

The upper plate spring 5 and the lower plate spring 9 are each made of, for example, an electrically conductive metal such as stainless steel or beryllium copper. The upper plate spring 5 and the lower plate spring 9 are each produced by (i) presswork of a predetermined thin plate or by (ii) etching thereof through photolithography.

(Configuration of Lower Plate Spring)

Figure 4:
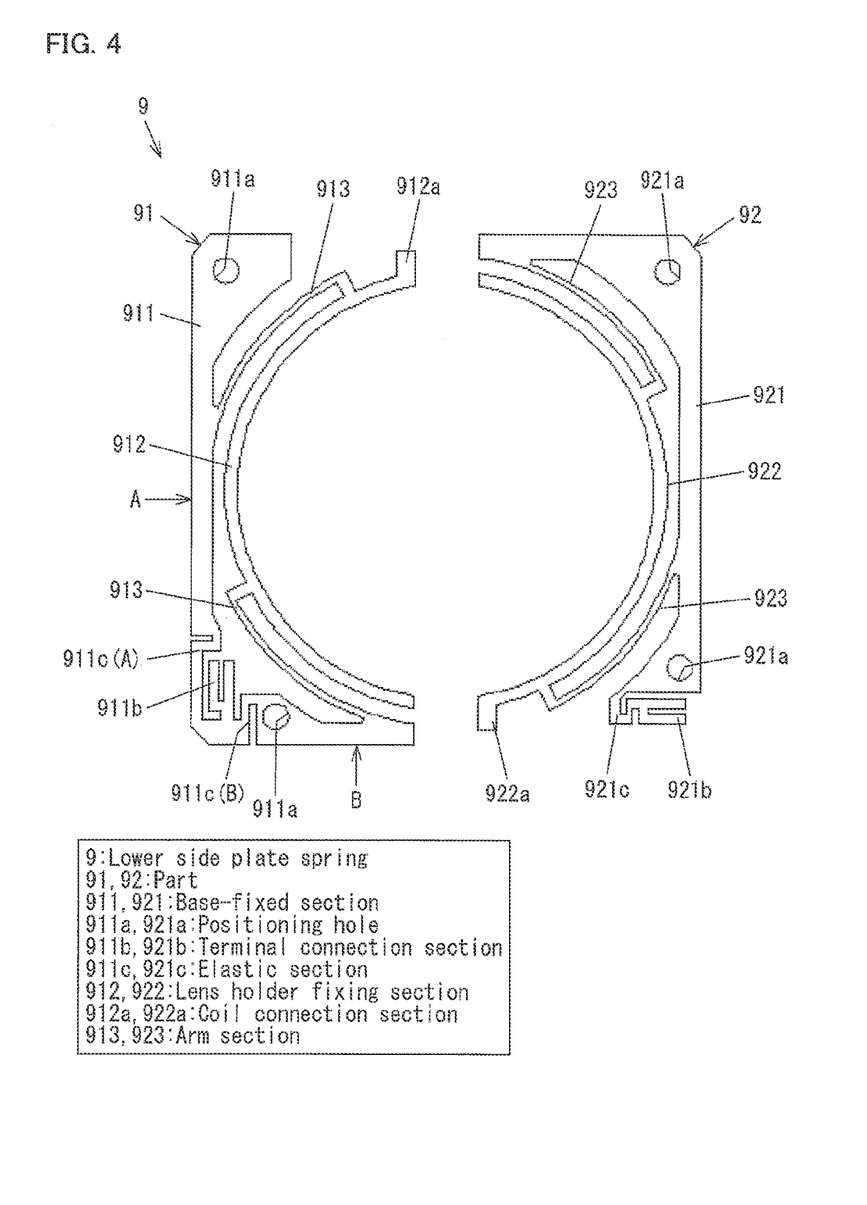
FIG. 4 is a plan view of a lower plate spring in accordance with an embodiment of the present invention.

The lower plate spring 9, as illustrated in FIG. 4, includes two parts, namely a part 91 and a part 92. The description below first deals mainly with the part 91 for points shared by the parts 91 and 92. The description below shows reference numerals in parentheses to indicate corresponding reference numerals for the part 92.

The part 91 (92) includes (i) a base-fixed section 911 (921) to be fixed to the base 11, (ii) a lens holder fixing section 912 (922) for fixing the lens holder 8 (movable lens unit 12), and (iii) two arm sections 913 (923).

The base-fixed section 911 (921) and the lens holder fixing section 912 (922) are connected to each other by the two arm sections 913 (923). The base-fixed section 911 (921) has positioning holes 911a (921a) and a terminal connection section 911b (921b). The terminal connection section 911b (921b) has a two-forked tip.

The lens holder fixing section 912 (922) is, as an example, in the shape of an arc corresponding to the shape of a lower end of the lens holder 8. The lens holder fixing section 912 (922) has a coil connection section 912a (922a) at an end thereof.

The base-fixed section 911 (921) is fixed to the base 11. The lens holder fixing section 912 (922) is fixed to the lower end of the lens holder 8.

The coil 7, as fixed to the lens holder 8, is aligned at a lower end thereof with the two coil connection sections 912a and 922a of the lower plate spring 9. The lower end of the coil 7 is connected by soldering or the like to the two coil connection sections 912a and 922a of the lower plate spring 9. The lower end of the coil 7 is thus connected to the two connection sections 912a and 922a at respective connection points that are opposite to each other.

The description below deals in detail with points on which the parts 91 and 92 differ from each other.

The part 91 is shaped as follows: The base-fixed section 911 has a terminal connection section 911b between the two arm sections 913. The terminal connection section 911b is disposed inside a closed path defined by the base-fixed section 911, the lens holder fixing section 912, and the two arm sections 913. The terminal connection section 911b protrudes so as to substantially extend from a front side of the base-fixed section 911 along its long-side direction to a back surface thereof. The base-fixed section 911 has elastic sections 911c near (specifically, at respective ends of) the terminal connection section 911b. The base-fixed section 911, in other words, includes a long-side segment A and a short-side segment B, and the terminal connection section 911b is connected at one end to the long-side segment A via an elastic section 911c (A) and at the other end to the short-side segment B via an elastic section 911c (B). The elastic sections 911c may each have a notch (see FIG. 4) to generate greater urging force.

The part 92 is shaped as follows: The base-fixed section 921 has a terminal connection section 921b at an end thereof. The terminal connection section 921b is thus located outside a space between the two arm sections 923. The terminal connection section 921b is, in other words, disposed outside a closed path defined by the base-fixed section 921, the lens holder section 922, and the two arm sections 923. The terminal connection section 921b protrudes so as to substantially extend outward (away from the part 91) along a short-side direction of the base-fixed section 921. The base-fixed section 921 has an elastic section 921c at an end of the terminal connection section 921b.

The shape described above of the part 91 (92) is merely an example, and may vary as appropriate depending on the respective shapes of the movable lens unit 12, the terminals 10, and the base 11.

(Arrangement of Terminals)

Figure 5:
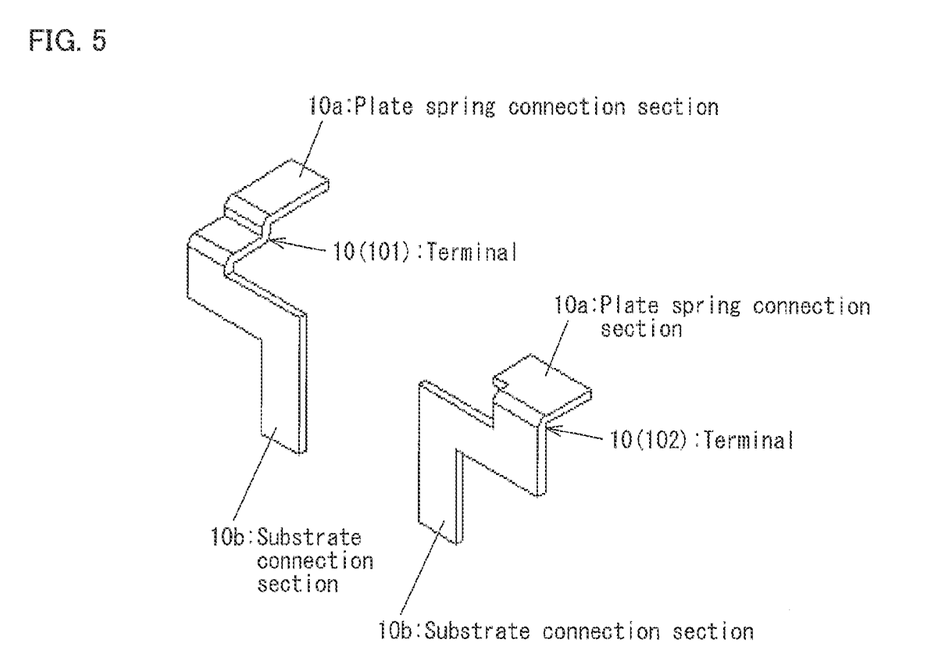
FIG. 5 is a perspective view of terminals in accordance with an embodiment of the present invention.

The two terminals 10 are each fixed to a predetermined position on the base 11. The two terminals 10, as illustrated in FIG. 5, each include a plate spring connection section 10a and a substrate connection section 10b, the plate spring connection section 10a and the substrate connection section 10b being connected substantially perpendicularly to each other.

The plate spring connection sections 10a are each electrically connected to the terminal connection section 911b or 921b of the lower plate spring 9.

The substrate connection sections 10b are each electrically connected to a terminal on the sensor substrate (not shown).

The two terminals 10 are, as an example, asymmetrical with each other in shape and length in correspondence with the shape of the base 11. The description below, in a case where it distinguishes between the two terminals 10, uses (i) the term "first terminal 101" to refer to the terminal 10 on the left side of the lens driving device 1 and (ii) the term "second terminal 102" to refer to the terminal 10 on the right side of the lens driving device 1. The first terminal 101 and the second terminal 102 are arranged as below.

The first terminal 101 has (i) a plate spring connection section 10a having a difference in level in the up-and-down direction and (ii) a substrate connection section 10b in an L shape.

The second terminal 102 has (i) a plate spring connection section 10a in the shape of a flat plate and (ii) a substrate connection section 10b in the shape of a crank (that is, an S shape).

The first terminal 101 and the second terminal 102, each of which has a plate spring connection section 10a in the shape of a plate, can be in plane contact respectively with the terminal connection section 911b of the part 91 and the terminal connection section 921b of the part 92.

(Arrangement of Base)

Figure 6:
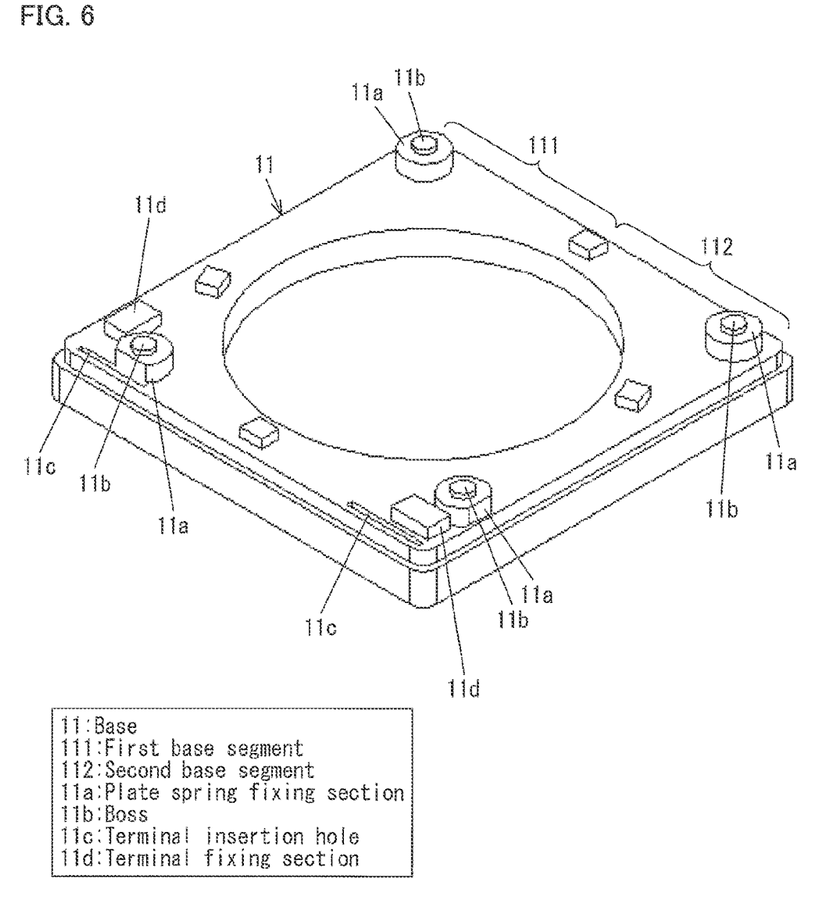
FIG. 6 is a perspective view of a base in accordance with an embodiment of the present invention.

The base 11, as illustrated in FIG. 6, includes as main members (i) four plate spring fixing sections 11a for fixing the lower plate spring 9, (ii) two terminal insertion holes 11c through which the terminals 10 are inserted, and (iii) two terminal fixing sections 11d for disposing the terminals 10. The spring fixing sections 11a each have a boss 11b.

The base 11, more specifically, includes (i) a first base segment 111 to which the part 91 and the first terminal 101 are fixed and (ii) a second base segment 112 to which the part 92 and the second terminal 102 are fixed. The first base segment 111 and the second base segment 112 correspond to respective halves of the base 11 as divided into two by a virtual center line extending in the up-and-down direction at the middle in the left-and-right direction.

The first base segment 111 includes (i) two spring plate fixing sections 11a, (ii) one terminal insertion hole 11c, and (iii) one terminal fixing section 11d.

The first base segment 111 is arranged as follows: The terminal insertion hole 11c is so disposed at a front end of the first base segment 111 as to be close to a left side surface of the first base segment 111. The terminal fixing section 11d is so disposed at a left end of the first base segment 111 as to be close to a front surface of the first base segment 111. One of the two spring plate fixing sections 11a is so disposed near the terminal fixing section 11d as to be adjacent to the terminal insertion hole 11c. The other spring plate fixing section 11a is disposed at a corner on a back side of the first base segment 111.

The second base segment 112 includes (i) the other two plate spring fixing sections 11a, (ii) the other terminal insertion hole 11c, and (iii) the other terminal fixing section 11d.

The second base segment 112 is arranged as follows: The terminal insertion hole 11c is so disposed at a front end of the second base segment 112 as to be close to a right side surface of the second base segment 112. The terminal fixing section 11d is so disposed near the front end of the second base segment 112 as to be adjacent to the terminal insertion hole 11c. One of the two plate spring fixing sections 11a is so disposed behind the terminal fixing section 11d as to be adjacent to the terminal fixing section 11d. The other plate spring fixing section 11a is disposed at a corner on a back side of the second base segment 112.

(Fixing Terminals to Base)

Figure 7:
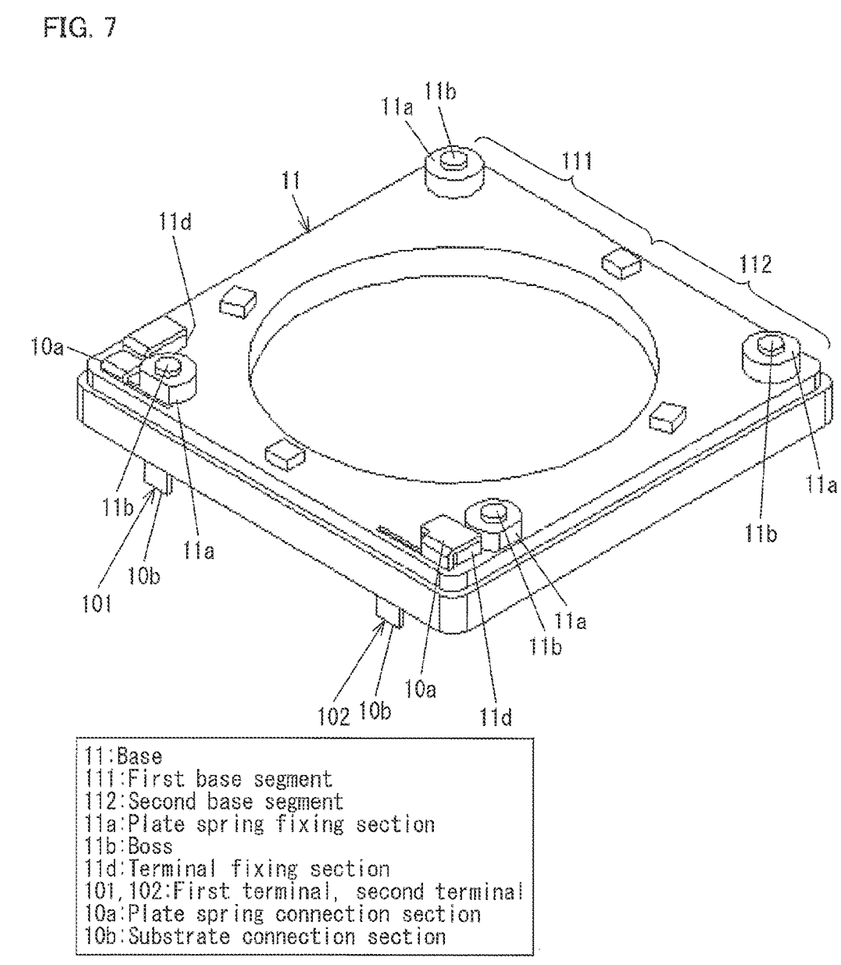
FIG. 7 is a perspective view of a base and terminals in accordance with an embodiment of the present invention.

The terminals 10 are, as illustrated in FIG. 7, each placed in position in a case where (i) the substrate connection section 10b is inserted into a corresponding terminal insertion hole 11c of the base 11 and (ii) the plate spring connection section 10a is brought into contact with an upper surface of a corresponding terminal fixing section 11d of the base 11.

The first terminal 101 is positioned on the first base segment 111 (left), whereas the second terminal 102 is positioned on the second base segment 112 (right).

The description below deals with (i) the respective shapes of the terminals 10, the terminal fixing sections 11d, and the plate spring connection sections 10a and (ii) the positional relationships therebetween. The respective plate spring connection sections 10a of the terminals 10 may each have a height and inclination adjusted as appropriate in correspondence with, for example, (i) the bend accuracy and/or thickness of the terminal 10 and/or (ii) the height and/or inclination of the corresponding terminal connection section 11d.

The plate spring connection section 10a of each terminal 10 is, when disposed on the corresponding terminal connection section 11d, higher than the corresponding plate spring connection section 11a of the base 11. In other words, the thickness of the plate spring connection section 10a of each terminal 10 is combined with the height of the corresponding terminal fixing section 11d to have a total height larger than the height of the corresponding spring plate fixing section 11a of the base 11.

The lower plate spring 9 is welded to the terminals 10. During the welding, the respective plate spring connection sections 10a of the terminals 10 are preferably in close contact with the lower plate spring 9. Further, the lower plate spring 9 is preferably welded to the terminals 10 by laser welding.

(Fixing Lower Plate Spring to Base)

Figure 1:
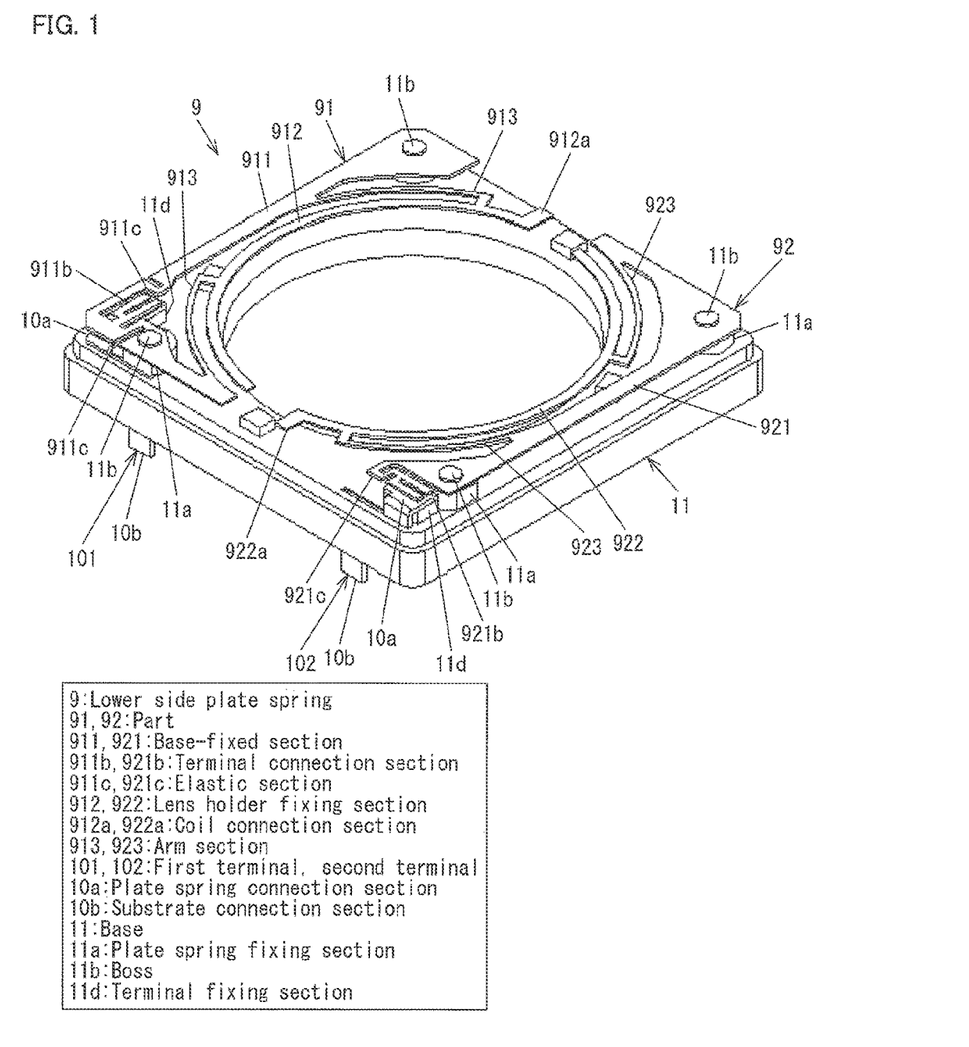
FIG. 1 is a perspective view of a base and a terminal lower plate spring in accordance with an embodiment of the present invention.

The lower plate spring 9 is fixed to the base 11 as illustrated in FIG. 1. That is, (i) the positioning holes 911a (921a) of the part 91 (92) are each so positioned as to be directly above the boss 11b on the corresponding plate spring fixing section 11a of the first base segment 111 (second base segment 112) of the base 11, and (ii) the boss 11b is then welded to the part 91 (92).

As described above, the plate spring fixing sections 11a of the first base segment 111 are positioned differently from those of the second base segment 112. This arrangement can prevent erroneously placing the lower plate spring 9 on the base 11 in such a manner that the part 91 coincides with the second base segment 112 and the part 92 coincides with the first base segment 111.

As described above, the plate spring connection section 10a of each terminal 10 is higher than the corresponding plate spring fixing section 11a of the base 11. Further, as described above, the part 91 includes elastic sections 911c near the terminal connection section 911b, whereas the part 92 includes an elastic section 921c near the terminal connection section 921b.

The elasticity of the elastic sections 911c (921c) allows the terminal connection section 911b (921b) to have the same height and inclination as the plate spring connection section 10a of the terminal 101 (102).

[Modification of Present Embodiment]

The shape of the lower plate spring 9 is not limited to the shape described above. The respective terminal connection sections 911b and 921b of the parts 91 and 92 may be positioned as appropriate in correspondence with the respective positions of the terminals 10 on the base 11.

The parts 91 and 92 of the lower plate spring 9 described above are asymmetrical with each other in shape, but are not limited to such an arrangement. The parts 91 and 92 may alternatively be symmetrical with each other in shape. The two parts of the lower plate spring 9 may be, for instance, substantially symmetrical with each other with respect to a straight line (not shown) extending through the middle of each side surface of the base 11 along the left-and-right direction. Such two parts may each have a shape identical to that of the part 91 or a shape identical to that of the part 92. In correspondence with the selected shape for the above two parts, adjustments may be made of, for example, (i) the respective shapes of the terminals 10, (ii) the respective positions of the plate spring fixing sections 11a, the terminal insertion holes 11c, and the terminal fixing sections 11d, and (iii) the position at which the lower plate spring 9 is connected to the coil 7. In other words, (i) the first base segment 111 and the second base segment 112 of the base 11 may be symmetrical with each other in shape, and (ii) the terminal 101 and the terminal 102 may also be symmetrical with each other in shape.

The lower plate spring 9 described above includes two members, namely the parts 91 and 92. The lower plate spring 9 is, however, not limited to such an arrangement, and may include a single member.

The part 91 (92) described above of the lower plate spring 9 has two arm sections 913 (923). The number of arm sections 913 (923) is, however, not limited to two. The part 91 (92) may include more or fewer arm sections 913 (923) in accordance with the desired energizing force. That is, the part 91 (92) may include a single arm section 913 (923) or more than two arm sections 913 (923).

CONCLUSION

A lens driving device in accordance with mode 1 of the present invention includes: a movable body (corresponding to the lens barrel 2 and the lens holder 8) holding a lens and movable along an optical axis of the lens; a driving mechanism (corresponding to the magnet 6 and the coil 7) for driving the movable body along the optical axis; a plate spring (corresponding to the lower plate spring 9; the parts 91 and 92) supporting the movable body in such a manner that the movable body is movable along the optical axis; and a base section (corresponding to the base 11; the first base segment 111 and the second base segment 112) to which the plate spring is attached, the driving mechanism including a driving coil (corresponding to the coil 7) to be attached to the movable body, the base section having a terminal (corresponding to the first terminal 101 and the second terminal 102) attached thereto for supplying electric current to the driving coil, the plate spring including: a movable-body-fixed section (corresponding to the lens holder fixing sections 912 and 922) fixed to the movable body and having a connection section electrically connected to the driving coil; a base-section-fixed section (corresponding to the base-fixed sections 911 and 921) fixed to the base section; an arm section (913 and 923) connecting the movable-body-fixed section and the base-section-fixed section to each other; a terminal connection section (911b and 921b) electrically connected to the terminal; and an elastic section (911c and 921c) connecting the base-section-fixed section and the terminal connection section to each other and urging the terminal connection section to the terminal.

The above arrangement allows electric connection between the terminal, the plate spring, and the driving mechanism (specifically, the driving coil). Thus, supplying electric power to the lens driving device causes the driving coil to generate driving force, thereby driving the movable section.

Further, with the above arrangement, the base-section-fixed section and the terminal connection section are connected to each other by the elastic section having elasticity. The elastic section thus urges the terminal connection section of the plate spring to the terminal.

This urging force causes the terminal connection section of the plate spring and the terminal to be in closer contact with each other.

The above arrangement allows stable connection between the plate spring and the terminal regardless of the accuracy of the terminal (that is, its bend accuracy or thickness accuracy) or the accuracy of the base. The above arrangement, therefore, advantageously provides a high-quality lens driving device.

A lens driving device in accordance with mode 2 of the present invention is arranged as in mode 1, and is further arranged such that the terminal (i) has a portion connected to the terminal connection section which portion is in a plate shape and (ii) is in plane contact with the terminal connection section.

With the above arrangement, the urging force of the elastic section causes respective surfaces of the terminal and the terminal connection section of the plate spring to be in closer contact with each other. The above arrangement, as a result, allows stabler connection between the plate spring and the terminal.

A lens driving device in accordance with mode 3 of the present invention is arranged as in mode 1 or 2, and is further arranged such that the terminal connection section and the terminal are connected to each other by laser welding.

Soldering the terminal and the terminal connection section of the plate spring to each other leads to the following problem: When the terminal and the substrate are soldered to each other, the soldering heat may melt the solder connecting the terminal and the terminal connection section of the plate spring to each other, possibly disconnecting the terminal and the terminal connection section of the plate spring from each other.

With the above arrangement, the terminal and the terminal connection section of the plate spring are not soldered to each other. Thus, when the terminal and the substrate are soldered to each other, the soldering heat does not disconnect the terminal and the terminal connection section of the plate spring from each other.

A lens driving device in accordance with mode 4 of the present invention is arranged as in any one of modes 1 to 3, and is further arranged such that the base section includes (i) a plate spring fixing section having an upper portion to which the base-section-fixed section is fixed and (ii) a terminal fixing section having an upper portion to which the terminal is attached; the terminal includes a plate spring connection section having an upper portion to which the terminal connection section is fixed; and in a state in which the terminal is attached to the terminal fixing section, a sum, at the plate spring connection section, of a thickness of the terminal and a height of the terminal fixing section is larger than a height of the plate spring fixing section.

With the above arrangement, in the state in which the terminal is attached to the terminal fixing section, the sum of the thickness of the terminal and the height of the terminal fixing section is larger than the height of the plate spring fixing section. Thus, in a case where the plate spring is fixed to the base section, the base-section-fixed section of the plate spring has a lower surface with a height so adjusted as to correspond to the height of an upper portion of the terminal.

The above arrangement allows the elastic section to have greater force that urges the terminal connection section to the terminal. This allows stabler connection between the plate spring and the terminal.

A lens driving device in accordance with mode 5 of the present invention is arranged as in any one of modes 1 to 4, and is further arranged such that the base-section-fixed section includes a first portion (corresponding to the long-side segment A or short-side segment B) and a second portion (corresponding to the short-side segment B or long-side segment A); and the elastic section includes (i) a first elastic portion (corresponding to the elastic section 911c (A or B)) connecting the first portion and the terminal connection section to each other and (ii) a second elastic portion (corresponding to the elastic section 911c (B or A)) connecting the second portion and the terminal connection section to each other.

With the above arrangement, the terminal connection section is connected to elastic sections at two respective positions, namely a first connection section and a second connection section. The above arrangement can thus achieve urging force greater than in the case where the elastic section includes only one elastic portion. The above arrangement, as a result, allows stabler connection between the plate spring and the terminal.

An electronic device in accordance with mode 6 of the present invention includes (i) a lens driving device of any one of modes 1 to 5 and (ii) a sensor substrate on which an image sensing element is mounted on the optical axis of the lens, the terminal being connected to the sensor substrate.

The present invention also encompasses in its scope an electronic device including the lens driving device described above and (ii) a sensor substrate on which an image sensing element is mounted on the optical axis, the terminal being connected to the sensor substrate.

The present invention is not limited to the description of the embodiments above, but may be altered by a skilled person within the scope of the claims. Any embodiment based on a proper combination of technical means disclosed in different embodiments is encompassed in the technical scope of the present invention. Further, a new technical feature can be formed by combining technical measures disclosed in the embodiments.

INDUSTRIAL APPLICABILITY

The present invention is applicable in the field of production of (i) electronic equipment (for example, mobile phones) having the function of capturing a still image or moving image or (ii) components of such electronic equipment.

REFERENCE SIGNS LIST

1 Lens driving device
2 Lens barrel
3 Yoke
4 Spacer
5 Upper spring plate
6 Magnet
7 Coil
8 Lens holder
9 Lower spring plate
91 Part
911 Base-fixed section
911a Positioning hole
911b Terminal connection section
911c Elastic section
912 Lens holder fixing section
913 Arm section
92 Part
921 Base-fixed section
921a Positioning hole
921b Terminal connection section
921c Elastic section
922 Lens holder fixing section
922a Coil connection section
923 Arm section
10 Terminal
101 First terminal
102 Second terminal
10a Plate spring connection section
10b Substrate connection section
11 Base
111 First substrate
112 Second Substrate
11a Plate spring fixing section
11b Boss
11c Terminal insertion hole
11d Terminal fixing section
12 Movable lens unit

The invention claimed is:

1. A lens driving device comprising:
a movable body configured to hold a lens and to move along an optical axis of the lens;
a driving mechanism configured to drive the movable body along the optical axis;
a plate spring configured to support the movable body in such a manner that the movable body is movable along the optical axis; and
a base section to which the plate spring is attached,
the driving mechanism including a driving coil to be attached to the movable body,
the base section comprising a terminal attached thereto for supplying electric current to the driving coil,
the plate spring including:
a movable-body-fixed section fixed to the movable body and having a connection section electrically connected to the driving coil;
a base-section-fixed section fixed to the base section, the base-section-fixed section including a first portion and a second portion;
an arm section configured to connect the movable-body-fixed section and the base-section-fixed section to each other;
a terminal connection section electrically connected to the terminal;
an elastic section connecting the base-section-fixed section and the terminal connection section to each other and urging the terminal connection section to the terminal, the elastic section including (i) a first elastic portion connecting the first portion of the base-section-fixed section and the terminal connection section to each other and (ii) a second elastic portion connecting the second portion of the base-section-fixed section and the terminal connection section to each other.

2. The lens driving device as set forth in claim 1, wherein the terminal (i) comprises a portion connected to the terminal connection section which portion is in a plate shape.

3. The lens driving device as set forth in claim 1, wherein the terminal connection section and the terminal are connected to each other by laser welding.

4. The lens driving device as set forth in claim 1, wherein:
the base section includes (i) the plurality of spring fixing sections each comprising an upper portion to which the base-section-fixed section is fixed and (ii) a terminal fixing section comprising an upper portion to which the terminal is attached;
the terminal includes a plate spring connection section comprising an upper portion to which the terminal connection section is fixed; and
in a state in which the terminal is attached to the terminal fixing section, a sum, at the plate spring connection section, of a thickness of the terminal and a height of the terminal fixing section is larger than a height of the plate spring fixing section.

* * * * *